(12) United States Patent
Kim

(10) Patent No.: US 11,246,691 B2
(45) Date of Patent: Feb. 15, 2022

(54) DENTAL FLOSS HOLDER CAPABLE OF CONTROLLING TENSION

(71) Applicants: DONGSEO MEDICARE CO., LTD, Seongnam-Si (KR); Sang Han Kim, Seongnam-Si (KR)

(72) Inventor: Sang Han Kim, Seongnam-Si (KR)

(73) Assignees: Dongseo Medicare Co., Ltd, Seongnam-si (KR); Sang Han Kim, Seongnam-si (KR)

( * ) Notice: Subject to any disclaimer, the term of this patent is extended or adjusted under 35 U.S.C. 154(b) by 499 days.

(21) Appl. No.: 15/735,927

(22) PCT Filed: May 16, 2017

(86) PCT No.: PCT/KR2017/005073
§ 371 (c)(1),
(2) Date: Dec. 12, 2017

(87) PCT Pub. No.: WO2018/070625
PCT Pub. Date: Apr. 19, 2018

(65) Prior Publication Data
US 2019/0110874 A1    Apr. 18, 2019

(30) Foreign Application Priority Data
Oct. 12, 2016   (KR) .................... 10-2016-0132086

(51) Int. Cl.
*A61C 15/04*    (2006.01)

(52) U.S. Cl.
CPC .................................. *A61C 15/046* (2013.01)

(58) Field of Classification Search
CPC ........ A61C 15/046; A61C 15/04; A61C 15/00
(Continued)

(56) References Cited

U.S. PATENT DOCUMENTS 5,038,806 A * 8/1991 Ewald ................. A61C 15/046
                                                            132/324
5,301,698 A * 4/1994 Ballard ................ A61C 15/046
                                                            132/325
(Continued)

FOREIGN PATENT DOCUMENTS

CN    2798868    *  7/2006    ............. A61C 15/04
CN    2928033    *  8/2007    ............. A61C 15/04
(Continued)

OTHER PUBLICATIONS

"KR 101121950—translated", Han, Kim Sang, Mar. 9, 2012, Dialog Translation from ProQuest (Year: 2012).*

*Primary Examiner* — Yogesh P Patel
*Assistant Examiner* — Jennifer Gill
(74) *Attorney, Agent, or Firm* — Sughrue Mion, PLLC (57) ABSTRACT

Disclosed is a dental floss holder which can control tension of dental floss which may be stretched or weakened during usage of the dental floss and prevent the tension of the dental floss from being decreased during usage of the dental floss by protrusions formed on a tension control portion. According to the present invention, there is provided a dental floss holder capable of controlling tension, the dental floss holder comprising: a body in which a head, to which a part for directly removing foreign matters of teeth from a dental floss is suspended, is provided at a front end thereof, a winding hole is through-formed in the middle thereof, and a locking pole which can be elastically deformed is formed around the winding hole; and a winding wheel which is inserted to the winding hole of the body to be rotatably provided, fixed when a part of the locking pole is suspended, and pulls the dental floss to maintain predetermined tension while rotating together when a part of the dental floss is suspended, in which the locking pole is formed in a cantilevered shape which is elastically deformable based on one end thereof, the (Continued)

locking protrusions are formed at the front end thereof to protrude in a longitudinal direction of the locking pole, locking grooves are grooved at predetermined intervals at a cylindrical insertion portion of the winding wheel along a trajectory which comes in contact with the locking protrusions while the winding wheel is rotated so that the locking protrusions are inserted to the locking grooves to fix the winding wheel.

2 Claims, 5 Drawing Sheets

(58) Field of Classification Search
 USPC ......... 132/325, 322, 324, 323, 326; D28/65, D28/66, 68
 See application file for complete search history.

(56) References Cited

U.S. PATENT DOCUMENTS

| | | | | |
|---|---|---|---|---|
| 5,678,578 A | * | 10/1997 | Kossak | A61C 15/046 |
| | | | | 132/322 |
| 5,819,769 A | * | 10/1998 | Gutierrez | A61C 15/046 |
| | | | | 132/327 |
| 6,363,949 B1 | * | 4/2002 | Brown | A61C 15/046 |
| | | | | 132/324 |
| 7,082,950 B2 | * | 8/2006 | Kossak | A61C 15/046 |
| | | | | 132/325 |
| 7,305,997 B2 | * | 12/2007 | Liu | A61C 15/046 |
| | | | | 132/325 |
| 2004/0255972 A1 | * | 12/2004 | Chen | A61C 15/046 |
| | | | | 132/325 |
| 2006/0254610 A1 | * | 11/2006 | Chen | A61C 15/046 |
| | | | | 132/325 |
| 2016/0310246 A1 | * | 10/2016 | Borg | A61C 15/046 |

FOREIGN PATENT DOCUMENTS

| | | | | |
|---|---|---|---|---|
| CN | 101234039 | * | 8/2008 | ............ A61C 15/04 |
| KR | 20-0182299 | * | 5/2000 | ............ A61C 15/046 |
| KR | 20-2000-0016156 | * | 8/2000 | ............ A61C 15/046 |
| KR | 2011-0019831 | * | 3/2011 | ............ A61C 15/04 |
| KR | 101121950 | * | 3/2012 | |
| KR | 10-1462916 | * | 11/2014 | ............ A61C 15/04 |

* cited by examiner

DENTAL FLOSS HOLDER CAPABLE OF CONTROLLING TENSION

TECHNICAL FIELD

The present invention relates to a dental floss holder for fixing dental floss which removes foreign matters between teeth, and more particularly, to a dental floss holder which can control tension of dental floss which may be stretched or weakened during usage of the dental floss and prevent the tension of the dental floss from being decreased during usage of the dental floss by protrusions formed on a tension control portion.

BACKGROUND ART

According to the survey of oral conditions in the world health organization (WHO), the average number of decayed teeth per 12-year-old child in Korea is 3.3 and twice more than the world average of 1.61. Furthermore, the prevalence of gum diseases in adults is over 70%. However, Korean people are working hard on brushing. Annual toothpaste usage per person in Korea was ranked second next to the United States (Survey of McKinsey in 2005). The daily number of brushing of Korean people is 2.35 times higher than that of 1.97 times in Japan. The reason for the high incidence of gum diseases despite the many brushing is due to low information on the use of floss.

Currently, in European countries and most developed countries, a dental floss is used after the meal to remove food between teeth. In some Asian countries, the frequency of use of floss holder and the dental floss is high, while in Korea, due to inadequate recognition and inadequate transmission of usage methods, the number of using toothpicks after the meal is more frequently than the number of using dental flosses. It is a matter of common knowledge that the dental floss is useful for removing food waste from teeth, and can be useful when removing plaque in case of gum diseases.

The floss holder is formed in a Y-shape as a tool to facilitate the use of such a dental floss. In general, the floss holder is fixed and used to both ends of the Y shape so as to have a desired tension.

However, conventional floss holders have the following problems.

The conventional floss holders are used by simply fixing the dental floss, and when the dental floss is loosened by use, the dental floss may interfere with the removal of foreign matters between the teeth.

In addition, if the dental floss does not maintain the desired tension, it is necessary to remove the used dental floss and fix a new dental floss again, and thus there is a problem in that the utilization of the dental floss is lowered.

In Korean Patent Registration No. 1635363, there is disclosed a dental floss holder. In the invention, the tension of the dental floss is maintained by using an annular dental floss pulling lever, but when the tension of the dental floss is decreased, the entire annular dental floss is replaced, and thus there is a problem in that the utilization of the floss is low.

In addition, since a portion of the dental floss holder to which the dental floss is suspended is inserted into the user's oral cavity, and in the case of the prior art, this portion is always exposed to the outside and is contaminated by external pollutants, and thus there is a problem in that it is cumbersome to use because it needs to be cleaned when reused.

In Korean Unexamined Patent Publication No. 2014-0146041, there is disclosed in a card type dental floss holder. In this invention, provided is a dental floss holder which is easily carried by using a dental floss winding portion having a flat shape and a housing, but there is a disadvantage that the dental floss portion is always exposed to the outside and is vulnerable to contamination.

DISCLOSURE

Technical Problem

In order to solve the problems, an object of the present invention is to provided a dental floss holder which can control tension of dental floss to a user's desired strength and prevent the tension of the dental floss from being decreased due to the reverse rotation of a tension control portion during usage of the dental floss by forming protrusions on the tension control portion.

Technical Solution

In order to achieve the above-mentioned objects, according to the present invention, there is provided a dental floss holder capable of controlling tension, the dental floss holder comprising: a body in which a head, to which a part for directly removing foreign matters of teeth from a dental floss is suspended, is provided at a front end thereof, a winding hole is through-formed in the middle thereof, and a locking pole which can be elastically deformed is formed around the winding hole; and a winding wheel which is inserted to the winding hole of the body to be rotatably provided, is fixed with a part of the locking pole being suspended thereto, and pulls the dental floss to maintain predetermined tension while rotating together when a part of the dental floss is suspended, in which the locking pole is formed in a cantilevered shape which is elastically deformable based on one end thereof, the locking protrusions are formed at the front end thereof to protrude in a longitudinal direction of the locking pole, locking grooves are grooved at predetermined intervals at a cylindrical insertion portion of the winding wheel along a trajectory which comes in contact with the locking protrusions while the winding wheel is rotated so that the locking protrusions are inserted to the locking grooves to fix the winding wheel.

Further, the winding wheel may include a rotary grip gripped by a user; a cylindrical insertion portion which is formed on one surface of the rotary grip to protrude in a cylindrical shape, inserted to the winding hole, and has a fixing slit formed in a longitudinal direction so that a part of the dental floss is suspended in the middle thereof; and a fixing protrusion which is formed to protrude from one end of the cylindrical insertion portion to be suspended to the fixing guide formed to protrude around the winding hole, thereby preventing the winding wheel from being arbitrarily separated.

The fixing protrusions may be formed in a cross (+) shape based on the insertion portion of the fixing slit and provided at a pair of insertion portions facing each other and divided by the fixing slit.

The head may include a pair of fixing bars which has a bar shape having a predetermined length, has protrusion ribs formed to protrude in a longitudinal direction thereof, and has guide slits formed on one surface of the protrusion rib so that the dental floss is inserted to be stably positioned; and a connector which positions the fixing bars to be spaced apart from each other at a predetermined distance.

Advantageous Effects

According to the present invention, the tension of the dental floss can be freely controlled by rotating the winding wheel, and when the tension of the dental floss is decreased in use, the tension can be re-controlled to desired tension by additionally rotating the winding wheel. Further, an undesired rotation of the winding wheel is prevented by interaction between the locking grooves formed in the cylindrical insertion portion of the winding wheel and the locking protrusions provided in the longitudinal direction of the locking pole, thereby preventing tension from being decreased due to reverse rotation of the winding wheel.

MODES OF THE INVENTION

Hereinafter, preferred exemplary embodiments of the present invention will be described in detail. In describing the present invention, when it is determined that the detailed description of the publicly known art related to the present invention may obscure the gist of the present invention, the detailed description thereof will be omitted. Throughout the specification and the claims, unless explicitly described to the contrary, when any element "comprises" any other element, it will be understood to imply the inclusion of stated elements but not the exclusion of any other elements.

The present inventors made watched carefully a problem that in existing dental floss holders, when tension of a dental floss is decreased, the dental floss is removed and a new dental floss needs to be used or the tension of the dental floss may be decreased due to reverse rotation of a tension control portion and made many efforts to solve the problem. As a result, the present inventors verified that in the case of using a dental floss holder including a rotatable winding wheel and a locking protrusion provided in a longitudinal direction of a locking pole, the tension of the dental floss can be easily controlled by rotating the winding wheel and the reverse rotation of the winding wheel is prevented by the locking protrusion to maintain the tension of the dental floss, and completed the present invention.

The dental floss holder according to the present invention is largely configured by a body 200 and a winding wheel 300. The body 200 includes a head 210 which is formed in a plate shape having a predetermined length and of which a part of directly removing foreign matters of teeth from a dental floss L is suspended to a front end, a winding hole 240 through-formed in the middle thereof, and a locking pole 250 which is formed around the winding hole 240 to be elastically deformed.

Figure 1:
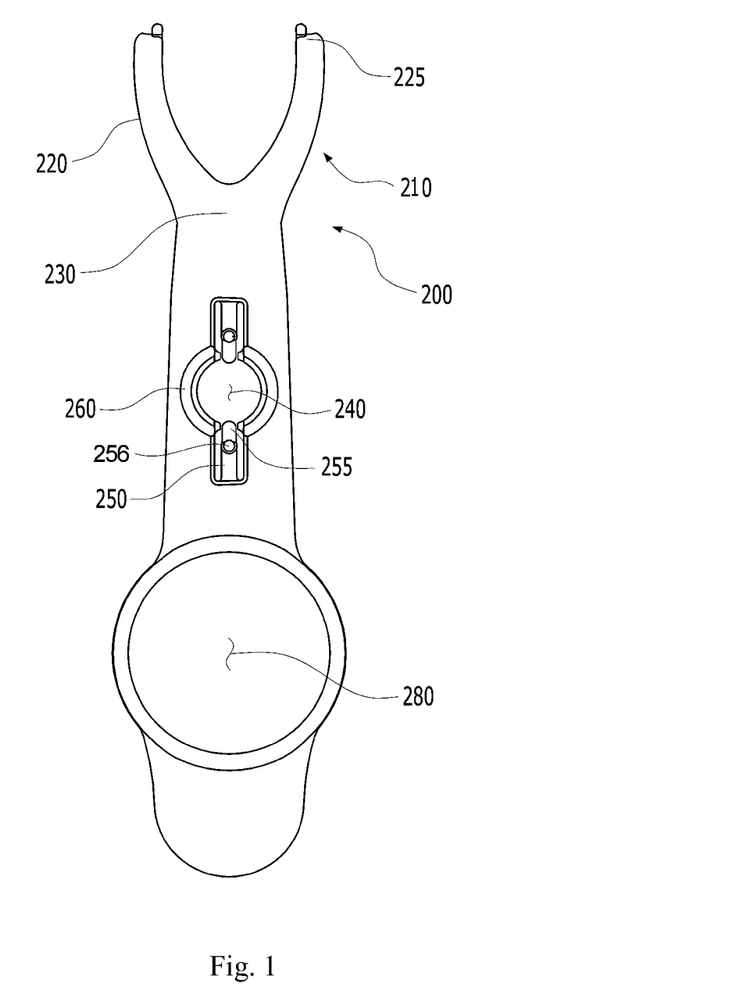
FIG. 1 is a front view of a body of a dental floss holder according to the present invention.
Figure 2:
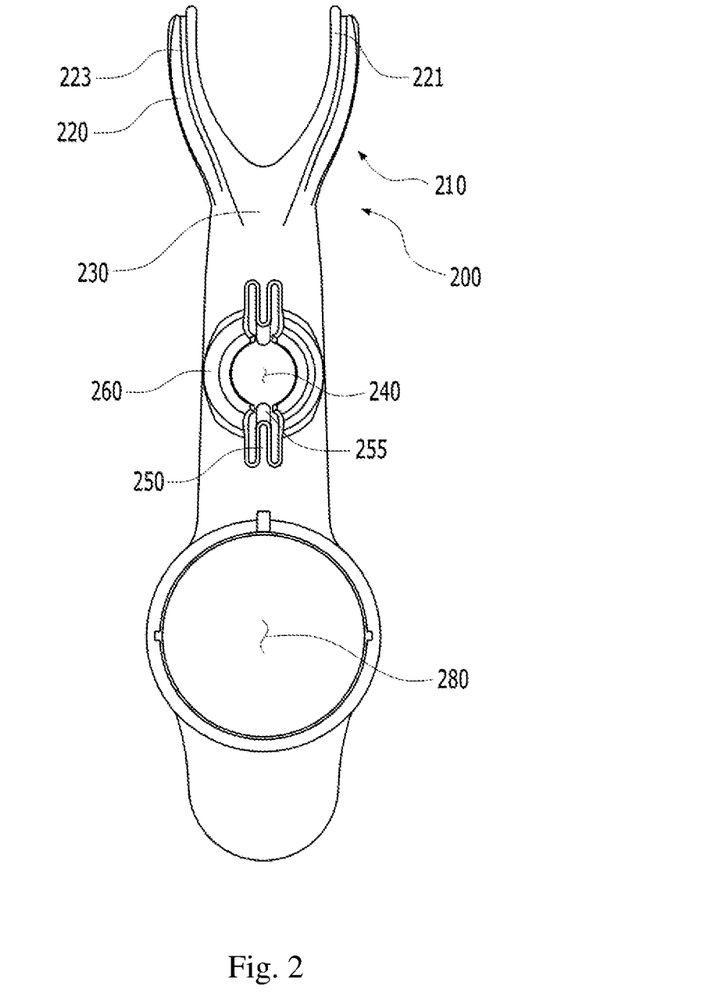
FIG. 2 is a rear view of the body of the dental floss holder according to the present invention.

As illustrated in FIGS. 1 and 2, the head 210 of the body 200 is formed in an approximately 'Y' shape and largely configured by fixing bars 220 and a connector 230. A pair of fixing bars 220 is provided, and the fixing bar has a bar shape having a predetermined length and has a protrusion rib 221 protruding in a longitudinal direction thereof, and a guide slit 223 is formed on one surface of the protrusion rib 221 so that the dental floss L is inserted to be stably positioned. A fixing groove 225 is formed at the front end of the fixing bar 220 so that the dental floss L may be seated. That is, the dental floss L is suspended to the fixing groove 225 and inserted to the guide slit 223 to be suspended and fixed to the winding wheel 300. A process of fixing the dental floss L will be described below in detail.

The fixing bars 220 are positioned to be spaced apart from each other at a predetermined distance by the connector 230. The dental floss L positioned between the fixing bars 220 is directly inserted between the teeth to remove foreign matters between the teeth.

The winding hole 240 is a part provided so that the winding wheel 300 is rotatable. As illustrated in FIGS. 1 and 2, the locking poles 250 are provided around the winding hole 240 so as to face each other. The locking pole 250 is formed so that one end thereof is connected to the body and both ends thereof can be elastically deformed in a width direction of the body in a cut cantilevered shape. The locking pole 250 serves to fix the winding wheel 300 in contact with the winding wheel 300.

In more detail, a locking protrusion 255 is formed at the front end of the locking pole 250 to protrude in a longitudinal direction of the locking pole 250, and in a rotary grip 310 of the winding wheel 300 to be described below, locking grooves 350 spaced apart from each other at predetermined intervals along a trajectory which comes in contact with the locking protrusions 255 while the winding wheel 300 is rotated are formed on an outer peripheral surface of a cylindrical insertion portion 320 which comes in contact with the locking protrusions 255 so that the locking protrusion 255 is inserted to the locking groove 350 to fix the winding wheel 300.

As illustrated in FIGS. 1 and 2, at the remaining part of the winding hole 240 except for the part provided with the locking pole 250, a fixing guide 260 is formed to protrude along the circumference of the winding hole 240. The fixing guide 260 serves to fix one end of the dental floss L together with the winding wheel 300 in a state where the tension is maintained. That is, the dental floss L is inserted between the winding wheel 300 and the fixing guide 260 to be fixed while being pulled by the pressure thereof. The detained description will be described below.

A configuration of the winding wheel 300 will be described in detail with reference to FIG. 3. The winding wheel 300 includes a rotary grip 310 gripped by a user; a cylindrical insertion portion 320 which is formed on one surface of the rotary grip 310 to protrude in a cylindrical shape, inserted to the winding hole 240, and has a fixing slit 330 formed in a longitudinal direction so that a part of the dental floss L is suspended in the middle thereof; and a fixing protrusion 340 which is formed to protrude from one end of the cylindrical insertion portion 320 to be suspended to the fixing guide 260 formed to protrude around the winding hole 240, thereby preventing the winding wheel 300 from being arbitrarily separated.

The rotary grip 310 is formed in a disk shape having a predetermined thickness as a part gripped by the user to rotate the winding wheel 300 and may be formed in various shapes such as a quadrangle, a pentagon, and the like, unlike the present exemplary embodiment.

The cylindrical insertion portion 320 formed to protrude from the one surface of the rotary grip 310 serves also to fix the dental floss L while the winding wheel 300 is rotatably provided in the winding hole 240. The cylindrical insertion portion 320 may be formed in a shape corresponding to the winding hole 240 so as to be smoothly rotated in the winding hole 240. The fixing slit 330 is formed in the insertion portion 320. The fixing slit 330 is a part to which the end of the dental floss L is inserted and suspended. More particularly, the middle portion of the dental floss L is suspended to the head 210 and the remaining both ends thereof are inserted through the fixing slit 330 together. After the both ends of the dental floss L are inserted through the fixing slit 330, the dental floss L is press-fitted and fixed between the fixing guide 160 and the outer surface of the insertion portion 320 while the winding wheel 300 rotates. In the exemplary embodiment, the fixing guide 260 is formed in a tight-line (-) shape to be divided into two, but if necessary, it is possible to form the insertion portion 320 to be divided in various directions other than the tight line, for example, four or five direction. In addition, when the cylindrical insertion portion 320 is inserted into the winding hole 240, the fixing slit 330 may be wider toward one end of the cylindrical insertion portion 320 to facilitate insertion. Since the fixing slit 330 below is formed at one end of the cylindrical insertion portion 320, the cylindrical insertion portion 320 is compressed when inserted to decrease the width.

A pair of fixing protrusions 340 facing each other is provided at division portions of the insertion portion 320 which is divided into two by the fixing slit 330, respectively. The fixing protrusion 340 is suspended to one end of the fixing guide 260 of the winding hole 240 when the winding wheel 300 is provided in the winding hole 240 to prevent the winding wheel 300 from being arbitrarily separated from the winding hole 240. Further, the fixing protrusion is divided into two parts by the fixing slit to facilitate the insertion and even though one part is damaged, the other part may be fixed normally.

In the rotary grip 310, a plurality of locking grooves 350 is provided on an outer periphery surface of the cylindrical insertion portion 320 along the circumference of the cylindrical insertion portion 320. The locking groove 350 is a portion to which the locking protrusion 255 of the locking pole 250 is inserted and the locking protrusion 255 is inserted to the locking groove 350 so that the winding wheel 300 is fixed so as not to rotate. The locking groove 350 is grooved in a shape corresponding to the locking protrusion 255 and a plurality of locking grooves is formed. The positions where the locking grooves 350 are formed are formed along the trajectory of a part where the locking protrusions 255 come in contact with the locking grooves 350 when the rotary grip 310 rotates.

That is, when the rotary grip 310 rotates, the trajectory where the locking protrusions 255 come in contact with the locking grooves 350 is located on the outer periphery surface of the cylindrical insertion portion 320. In the exemplary embodiment, six locking protrusions are formed, and if necessary, it is apparent that the number of locking protrusions can be changed.

The winding wheel 300 is fixed when the locking protrusion 255 is inserted to the locking groove 350 and the locking pole 250 formed with the locking protrusion 255 may be elastically deformed. Accordingly, when the winding wheel 300 moves from one locking groove 350 to an adjacent locking groove 350 while the winding wheel 300 rotates, the locking pole 250 is elastically deformed. In more detail, when the winding wheel 300 moves to the adjacent locking groove 350, the locking protrusion 255 deviates from the locking groove 350 and comes in contact with the outer peripheral surface of the cylindrical insertion portion 320. In this state, the locking pole 250 is elastically deformed in a width direction of the body 200. Thereafter, when the locking protrusion 255 is inserted to the locking groove 350 by rotating the rotary grip 310, the locking pole 250 is restored to fix the winding wheel 300.

In the present invention, it is preferred that the locking protrusion 255 is provided in the longitudinal direction of the locking pole 250. When the locking protrusion 255 is provided in a vertical direction to the locking pole 250, it is difficult to fix a normal position of the locking protrusion 255 when the locking protrusion 255 is worn by many uses. However, when the locking protrusion 255 is provided in the longitudinal direction, the length of the locking protrusion 255 is relatively increased so that the position of the winding wheel 300 may be fixed even if there is some wear. Further, when the fixing protrusion 340 is damaged or worn due to a lot of use or impact, a gap in the winding wheel 300 may occur in a vertical direction.

In this case, when the locking protrusion 255 is provided in a vertical direction to the locking groove 350, the winding wheel 300 has a gap and thus there may be a problem in fixation. However, when the locking protrusion 255 is provided in the longitudinal direction of the locking pole 250, the winding wheel 300 can be fixed without any problem even if there is a certain gap. However, it is also possible to provide the locking protrusions both in the longitudinal direction and in the vertical direction of the winding wheel for a stronger fixing or for high durability.

Also, the present invention may include a case 400 in which a head seating portion 410 is formed so that the head is inserted to protect the dental floss from external contaminants. In the inside of the case, the head seating portion is formed so that the head 210 is inserted to prevent the head 210 from being contaminated from external contaminants such as dust. The head 210 is inserted to the head seating portion of the case to cleanly protect the head 210.

Reference numeral 280 represents an insertion portion of a dental floss case, and when the dental floss case is integrally formed, the dental floss case including the wound dental floss is inserted and can be used, and after the dental floss is used, the used dental floss may be replaced with a new dental floss.

Hereinafter, a process of assembling the winding wheel 300 to the winding hole 240 of the body 200 will be described. When the user inserts the winding wheel 300 to the winding hole 240, the locking groove 350 of the winding wheel 300 is inserted toward the locking protrusion 255 of the locking pole 250.

The insertion portion 320 is divided into two parts by the fixing slit 330, and the two divided parts of the insertion portion 320 can be elastically deformed in a direction in which the two parts approach each other. The user inserts the insertion portion 320 to the winding hole 240 by elastically deforming the insertion portion 320 provided with the fixing protrusion 340 of the winding wheel 300 so that the insertion portion 320 may be inserted into the winding hole 240. In this state, when the user continuously pushes the insertion portion 320 to the winding hole 240, the fixing protrusion 340 is restored and suspended while being engaged with the fixing guide 260 of the winding hole 240.

Even after the winding wheel 300 is coupled to the winding hole 240, the locking protrusion 255 of the locking pole 250 may not be completely coupled to the locking groove 350 of the winding wheel 300. Accordingly, the user rotates the winding wheel so that the locking protrusion 255 is inserted to the locking groove 350 of the winding wheel 300. Since the locking pole 250 can be elastically deformed, the locking pole 250 is elastically deformed while the locking protrusion 255 is not completely coupled to the locking groove 350 because the locking pole 250, and the locking pole is restored to the original position again when the locking protrusion 255 is accurately inserted to the locking groove 350.

Hereinafter, a method of using the dental floss holder according to the exemplary embodiment of the present invention will be described in detail with reference to the accompanying drawings.

Figure 4:
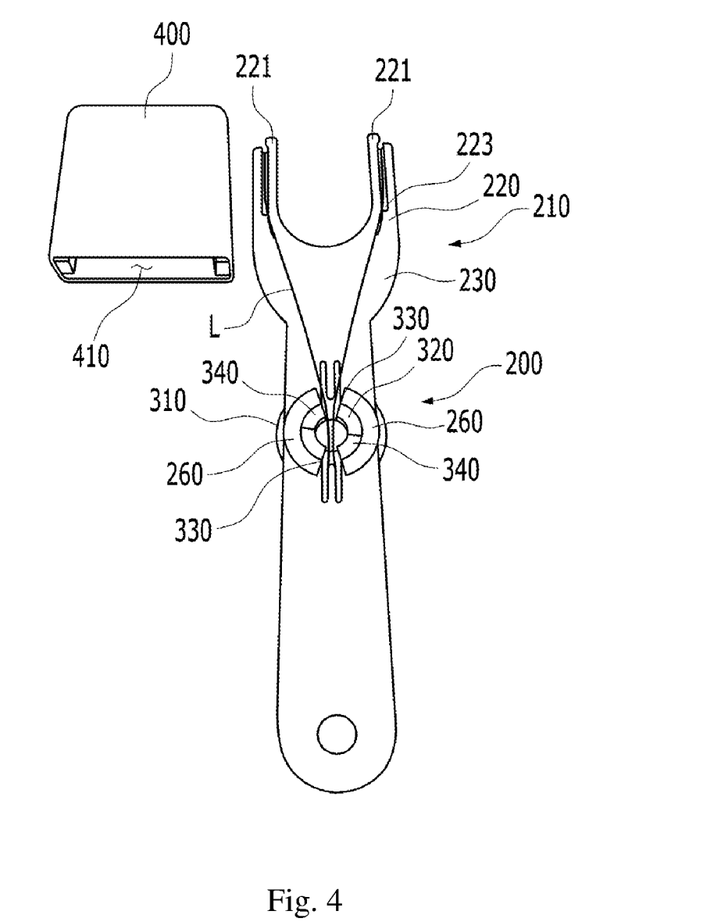
FIGS. 4 and 5 are operational flowcharts showing a process of fixing dental floss to the dental floss holder according to the present invention.
Figure 5:
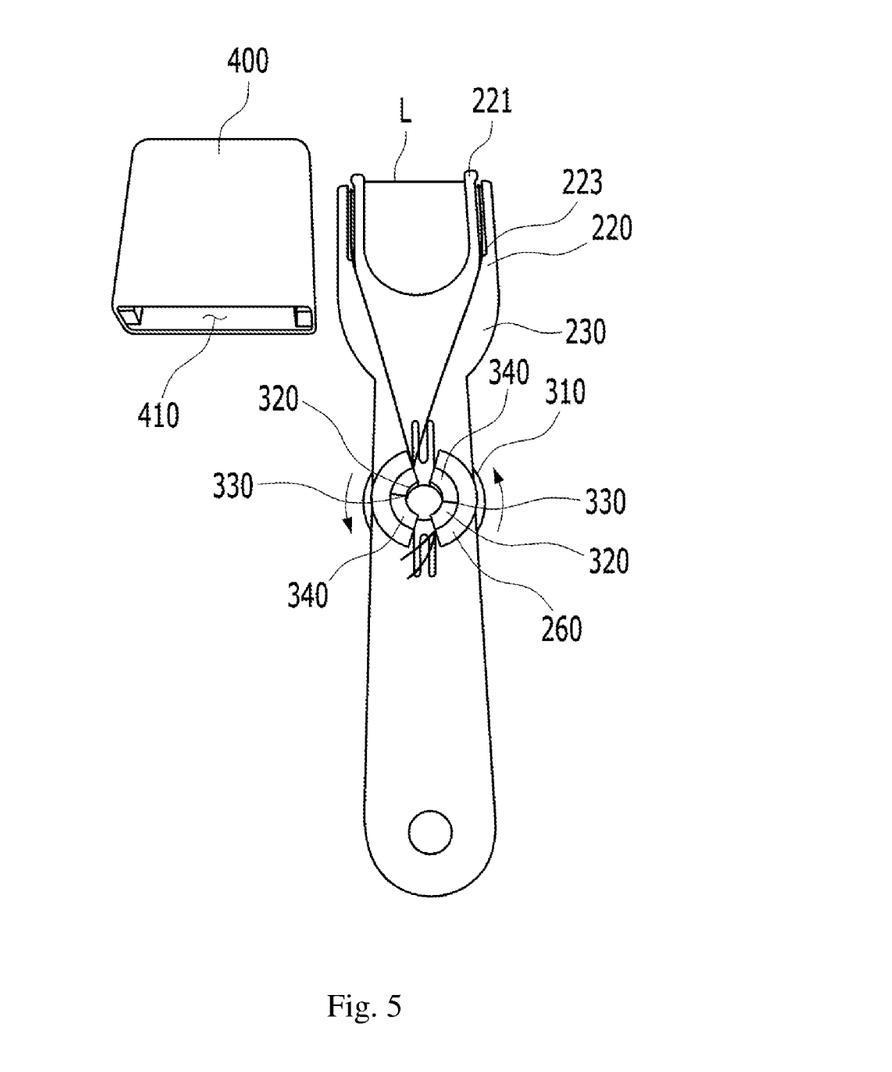

FIGS. 4 and 5 illustrate operational flowcharts showing a process of fixing the dental floss to the dental floss holder according to the exemplary embodiment of the present invention.

First, the user cuts the dental floss L with a predetermined length. In this case, the cut length of the dental floss L is sufficiently cut so that the middle of the dental floss L is located at the fixing groove 225 of the head 210 and both ends may be inserted to the fixing slit 330 of the winding wheel 300 together.

Thereafter, the user rotates the winding wheel 300 so that the fixing slit 330 of the winding wheel 300 faces the locking pole 250. That is, the opened portion of the fixed slit 330 is located between the fixing guides 260 of the winding hole 240.

In this state, the user fixes one end of the dental floss L to an opposite side to the portion of the fixing slit 330 facing the head 210 from the body 200 with a hand. Thereafter, after a part of the dental floss L is located to pass between the fixing slits 330, the dental floss L is suspended to the fixing groove 225 of the fixing bar 220 at one side of the head 210 and the dental floss L is suspended to the fixing groove 225 of the other fixing bar 220 again. In this case, the dental floss L is suspended to be located inside the guide slit 223 of the fixing bar 220. When the dental floss L is completely suspended to the fixing groove 225, the other end of the dental floss L may pass between the fixing slits 330 so that both ends of the dental floss L are fixed together. Such a state is illustrated in FIG. 4.

In this state, the user rotates the winding wheel 300. The rotation direction may be both clockwise and counterclockwise. When the winding wheel 300 rotates, a part of the dental floss L is inserted between the outer surface of the insertion portion 320 of the winding wheel 300 and the fixing guide 260 around the winding hole 240. The dental floss L is fixed by the pressure between the insertion portion 320 of the winding wheel 300 and the fixing guide 260.

The tension of the dental floss L is determined by the amount of rotation of the winding wheel 300. As the winding wheel 300 rotates more, the tension of the dental floss L increases and the thickness of the dental floss L becomes smaller so much.

The winding wheel 300 is fixed by inserting the locking protrusion 255 of the locking pole 250 to the locking groove 350 of the winding wheel 300. Since a plurality of locking grooves 350 of the winding wheel 300 are formed, the user rotates the winding wheel 300 if necessary to be controlled at a desired angle, more particularly, so that the dental floss L may have user's desired tension.

The user may use the dental floss L so that the dental floss L has the tension suitable to be used in user's teeth or the thickness thereof is controlled, thereby improving availability of the dental floss L.

In addition, there is a case where the tension of the dental floss L is decreased by use, but in the case of the dental floss holder in the related art, there is an inconvenience that the dental floss L needs to be replaced. However, in the case of the dental floss holder according to the present invention, when the tension of the dental floss L is decreased, the desired tension may be obtained again by rotating the winding wheel 300 so that the dental floss L can be used for a longer period.

After the user completes the use of the dental floss L, the head 210 is washed with water, and then the head 210 may be inserted into the case and stored in the case. It is important that the head 210 is cleaned by a portion inserted into the user's mouth, and according to the present invention, since the head 210 is protected from external contaminants by the case, there is an advantage in that the head 210 may be more cleanly used and easily portable.

Hereinafter, specific Examples of the present invention will be described.

EXAMPLE 1

Figure 3:
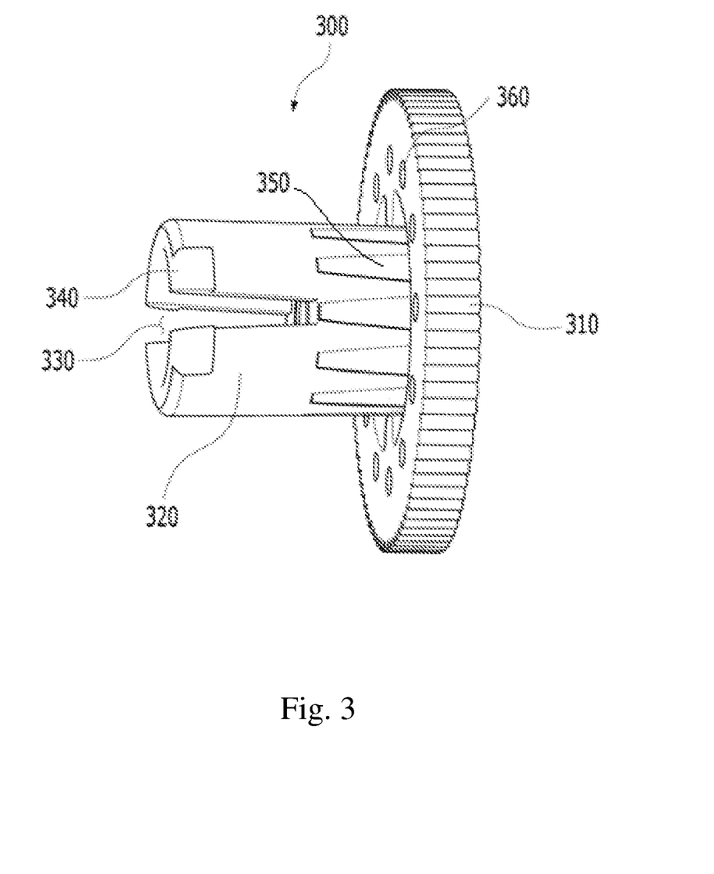
FIG. 3 is a perspective view of a winding wheel according to the present invention.

A dental floss holder was manufactured in the same shape as FIGS. 1 to 3, and when the winding wheel 300 was inserted to the winding hole 240, the locking groove 350 of the winding wheel 300 was inserted toward the locking protrusion 255 of the locking pole 250. In manufacturing, the body 200 was made of polycarbonate and the winding wheel 300 was made of polyvinyl chloride to be assembled. The locking protrusion 255 was provided in a longitudinal direction of the locking pole 250. Further, the locking groove 350 corresponding to the locking protrusion 255 was provided on the outer peripheral surface of the cylindrical insertion portion 320.

COMPARATIVE EXAMPLE 1

Comparative Example 1 was the same as Example 1, but a locking protrusion 256 was provided in a vertical direction of the locking pole, and a locking groove 360 corresponding to the locking protrusion 256 was provided on an inner plane of the rotary grip.

COMPARATIVE EXAMPLE 2

Comparative Example 2 was the same as Example 1, but the locking protrusions 255, 256 were provided in a longitudinal direction and a vertical direction of the locking pole, and the locking grooves 350, 360 corresponding to the locking protrusions 255, 256 were provided on the outer peripheral surface of the cylindrical insertion portion 320 and an inner plane of the rotary grip.

COMPARATIVE EXAMPLE 3

Comparative Example 3 was the same as Example 1, but the locking protrusion and the locking groove were not provided.

TEST EXAMPLE 1

Use tests of the dental floss holders manufactured in Example 1 and Comparative Examples 1 to 3 were performed. A durability test of the winding wheel according to the position of each locking protrusion and a convenience test when the winding wheel was rotated were performed, and each test was performed by the trained researcher.

TABLE 1

| | Durability test | | | Rotational convenience test |
|---|---|---|---|---|
| | Rotating 50 times | Rotating 200 times | Rotating 500 times | |
| Example 1 | Fixed at desired position | Fixed at desired position | Fixed at desired position | Smoothly rotatable |
| Comparative Example 1 | Fixed at desired position | Fixed at desired position | Not fixed | Smoothly rotatable |
| Comparative Example 2 | Fixed at desired position | Fixed at desired position | Fixed at desired position | Require large force at the time of rotating |
| Comparative Example 3 | Not fixed | Not fixed | Not fixed | Smoothly rotatable (not fixed) |

As illustrated in Table 1 above, in the case of Example 1 and Comparative Example 2 in which the locking protrusions were provided in the longitudinal direction of the locking pole, the winding wheel was fixable at desired positions even in rotating of the winding wheel 500 times. However, in the case of Comparative Example 1 in which the locking protrusion was provided only in the vertical direction of the locking pole, the winding wheel was not fixed at a desired position after rotation 200 times. It is determined that the locking protrusion and the fixing protrusion are worn by the rotation of the winding wheel and the winding wheel is not fixed at a desired position, which is the same as in Comparative Example 3 in which no locking protrusion is provided.

Also, even in the rotational convenience test, in the case of Example 1 and Comparative Example 1 in which a pair of locking protrusions were provided, the winding wheel was rotatable without difficulty, but in Comparative Example 2 in which the locking protrusions were additionally provided, large force was required at the time of rotating and the convenience of use was decreased. In the case of Comparative Example 3, although the least force was required in the rotation, the winding wheel was not fixed after rotation to be difficult to use.

Hereinabove, preferred exemplary embodiments of the present invention were described in detail. The aforementioned description of the present invention is to be exemplified, and it can be understood by those skilled in the art that the technical spirit or required features of the present invention can be easily modified in other detailed forms without changing.

Therefore, the scope of the present invention is represented by claims to be described below rather than the detailed description, and it is to be interpreted that the meaning and scope of the claims and all the changes or modified forms derived from the equivalents thereof come within the scope of the present invention.

What is claimed is:
1. A tension controlled dental floss holder comprising:
a body extending in a first direction and including a head provided at a front end of the body, a winding hole formed in the middle of the body and having a fixing guide formed to protrude along a circumference of the winding hole, and an elastically deformable locking pole formed around the winding hole and extending in the first direction;
a winding wheel rotatably received in the winding hole, wherein the winding wheel includes a rotary grip and a cylindrical insertion portion formed on a side of the rotary grip and extending in a second direction vertical to the first direction, and the cylindrical insertion portion includes an outer peripheral surface and a plurality of first locking grooves formed on the outer peripheral surface, each of the plurality of first locking grooves extending in the second direction, and the rotary grip includes a plurality of second locking grooves formed on the side of the rotary grip;
a first locking protrusion formed at an end of the locking pole in a lengthwise direction of the locking pole for being engaged into a first locking groove among the plurality of first locking grooves formed on the outer peripheral surface of the cylindrical insertion portion of the winding wheel, the lengthwise direction being the first direction; and
a second locking protrusion formed at the locking pole and extending in the second direction for being engaged into a second locking groove among the plurality of second locking grooves formed on the side of the rotary grip,
wherein the locking pole is in a bar shape and is formed in a cantilever style,
wherein the first locking protrusion includes a tip protruded in the lengthwise direction of the locking pole for being snapped into or out of the first locking groove,
wherein the plurality of first locking grooves are arranged with a constant interval on the outer peripheral surface of the cylindrical insertion portion of the winding wheel, and the first locking groove among the plurality of first locking grooves comes to contact with the first locking protrusion while the winding wheel is rotated, so that the first locking protrusion is engaged into the first locking groove to fix the winding wheel,
wherein the cylindrical insertion portion is protruded in a cylindrical shape, inserted into the winding hole, and has a fixing slit forming a cut-out cavity at an end of the cylindrical insertion portion, so that a part of a dental floss is retained therein,
wherein the winding wheel includes a pair of fixing protrusions formed to protrude from the end of the cylindrical insertion portion for being sustained to the fixing guide, thereby preventing the winding wheel being arbitrarily separated from the winding hole, and
wherein the pair of fixing protrusions are formed at the end of the cylindrical insertion portion divided by the fixing slit, the pair of fixing protrusions facing each other.

2. The dental floss holder according to claim 1, wherein the head includes:
a fixing bar having U shape and comprising protrusion ribs formed to protrude along a contour of the fixing bar, and guide slits for suspending the dental floss between the protrusion ribs; and
a connector for positioning the fixing bars to be spaced apart from each other at a distance.

\* \* \* \* \*